Patented Aug. 26, 1947

2,426,402

UNITED STATES PATENT OFFICE 2,426,402

CAST POLYMERIZATION OF MIXTURES OF DIALLYL PHTHALATE AND AN ACRYLIC ESTER

John K. Magrane, Highland Park, Amos Raymond Esterly, Metuchen, and Richard E. Davies, Plainfield, N. J., assignors to Catalin Corporation of America, a corporation of Delaware No Drawing. Application April 8, 1944, Serial No. 530,230

2 Claims. (Cl. 18—58)

This invention relates to a method of casting and curing diallyl phthalate plastics.

Diallyl phthalate polymer is a thermosetting plastic that has numerous advantages. When properly made, it is practically water white. It is of good adhesive strength and shrinks during setting; it tends, therefore, to draw together articles impregnated or coated with it as, for example, thin sheets used in the manufacture of laminated wood, glass, paper, or metal products.

The adhesive strength and shrinkage of the material during setting, however, introduce difficulties in making cast plastics. The diallyl phthalate plastic when set in a usual mold adheres to the mold and accommodates the setting shrinkage by separation from itself which causes crazing in zones that sparkle in the finished plastic. Heretofore there has been no method of overcoming this crazing and at the same time making diallyl phthalate plastics satisfactorily hard for general use.

An additional difficulty in the making of the diallyl phthalate plastics arises in that the surface of the plastic composition that is exposed during the setting and, in most cases, also the surface of the composition that is in contact with the walls of the mold remain soft or tacky after the interior portions of the plastic are cured to the desired extent.

The present invention provides means for overcoming these disadvantages in diallyl phthalate plastics.

In the preferred embodiment, the invention comprises the admixture with the diallyl phthalate of a heat polymerizable acrylic ester, a polymerization promoter and a parting material that is preferably initially dissolved but subsequently exuded by the mixture, and then shaping and warming the mixture, to cause polymerization and attendant hardening of the composition, the warming being effected to advantage in two or more stages, first at moderate temperature until the soft gel stage is passed and some shrinkage has occurred and later at a somewhat higher temperature to cause curing and attendant final hardening.

*Effect of various materials and conditions used*

The effect of the parting material is to provide lubrication or separation between the plastic being polymerized and the surface of the mold at the critical time when, in the absence of the parting material, the composition would stick to the sides of the mold. If this adhesion occurs, then the shrinkage of the diallyl phthalate subsequent to the adhesion must be accommodated entirely by sinking of a free surface such as the upper or separation of the composition from itself, with the appearance of the crazing zones which must be avoided in all perfect castings. Both these results of shrinkage of the diallyl phthalate are usually observed. If there were provided a proper coating of the mold surfaces that is not soluble in the plastic composition and that remains as a continuous layer over all parts of the mold in contact with the composition during the said critical time, or in case there is developed a mold surface that for some reason or other does not adhere to the plastic composition, then the parting material may be omitted from the composition of the present invention. We do not know of any satisfactory coating or mold material at this time that makes possible the omission of the admixed parting compound.

The heat polymerizable acrylic ester may be omitted if its effect upon the hardness and color of the cured material is not necessary in a particular use of the plastic. The addition of this ester, however, causes a great improvement in the hardness, decreases the discoloration developed, and shortens the period of time required to develop a given hardness of the product. Furthermore, it is considered that the ester is effective in decreasing somewhat the extent of gelling, which causes adherence to the surfaces of the mold before the polymerization and attendant shrinkage have progressed sufficiently to make the adherence from that stage on less objectionable.

The organic peroxide accelerates the polymerization and is necessary in obtaining a hard product in a reasonable period of time.

Likewise the exclusion of air, as from the upper surface of the material being polymerized in the mold, contributes to this same effect. Exclusion of the air prevents forming over the exposed surface of the plastic composition, including the peroxide promoter, a thin layer that gels and never sets hard.

It may be said that the objectionable adherence of the plastic to the surface of the mold and difficulty of final curing to desired hardness are decreased by exclusion of air and the poly stage polymerization using first moderate and then higher temperature. The adherence to the mold is decreased also by the parting material which gives a lubricating or separating film at the time when such film is most important in avoiding adherence to the walls of the mold.

All of the conditions and additions described decrease crazing and contribute to satisfactory casting, curing, and removal from the mold of diallyl phthalate plastics.

While the invention will be illustrated by description of the plastic composition and method utilizing all of these factors, it should be understood that some of the features may be omitted as described elsewhere herein, with the production of commercial plastics of improved properties.

*Materials and proportions of materials used*

Examples of the acrylic esters that are particularly satisfactory are the methacrylate esters of the lower aliphatic alcohols such as methyl, ethyl, and propyl. Also there may be used the corresponding esters of acrylic acid. Because of the hardness and other desirable properties given on its interpolymerization with diallyl phthalate, methyl methacrylate is the monomer that is preferred as admixture with the diallyl phthalate.

In general, the acrylic esters must be polymerizable on heating to a solid material. Thus the esters used, when heated alone or with a polymerization catalyst to an elevated temperature below the boiling point of the monomer, undergo change to non-fluid condition.

The proportion of the acrylic ester used is for commercial results about 5 to 25 parts for 100 parts of combined weight of the said ester and diallyl phthalate. As the acrylic ester content is increased, less promoter may be and preferably is used. Thus at 50% acrylic ester, we have used to advantage 0.25% of benzoyl peroxide. When larger proportions of acrylic ester are used, lower heat distortion points are obtained.

As the promoter of polymerization, there is used one that is usual for accelerating polymerizations of the present type. Organic peroxides, as, for example, benzoyl peroxide, toluyl peroxide, acetyl peroxide, lauryl peroxide, and stearyl peroxide are satisfactory. Benzoyl peroxide is readily available and gives the best results. No other peroxide is recommended for commercial operation.

The proportion of the polymerization promoter or accelerator used is about 0.25 to 2 parts for 100 parts of the polymerizable materials used and preferably is about 0.5 to 1 part and somewhat less with proportions of acrylic ester above 25%. Larger proportions are not necessary. Amounts below the range recited do not give sufficiently rapid polymerization to make the plastic satisfactory in numerous commercial operations of shaping and setting.

One of the surprising effects of the peroxide when used as promoter of polymerization is illustrated by the following fact. When benzoyl peroxide, for instance, is present in the plastic mixture in about the proportions shown, contact of air with a surface of the material during the setting causes that surface to remain tacky after the setting is completed. When no benzoyl peroxide is present in the composition undergoing polymerization, contact of air with the surface causes the surface to be hard and is in fact required to prevent the surface from being tacky.

The parting material that we prefer is one which during the setting of the plastic is constantly present as a continuous film between the plastic and the inner surface of the mold and preferably is one that is exuded or sweated out during the setting.

Thus, we have used to advantage a parting material that in the proportion used is soluble in the hot monomer subjected to curing but is not completely soluble and therefore is exuded as the monomer is polymerized.

An example of a parting material that is satisfactory for the present purpose is the following:

A mixture of a liquid polyhydric alcohol and a mutual solvent for the said alcohol and the polymerizable material in monomer form. Thus, there may be used glycerine, ethylene glycol, propylene glycol or the like containing no ether group in conjunction with an ether-alcohol, as for example, diethylene glycol, dipropylene glycol, or ethylene glycol monoethyl ether. The ether-alcohol causes solution of the polyhydric alcohol, which is known to be insoluble in the liquid monomer mixture. During the warming and polymerization, the ether alcohol loses its solubilizing effect to a substantial extent, the result being exuding of the polyhydric alcohol from the surfaces of the mass being polymerized. The material so exuded serves as a parting or separating material extending between the plastic and the mold surfaces.

Usually about 1 to 10% of total parting composition is adequate. More specifically we have used to advantage 1 to 2% of glycerine or ethylene glycol in conjunction with ½ to 5% and ordinarily 2 to 5% of diethylene glycol, on the weight of the polymerizable compounds present.

*Conditions of curing*

The exclusion of air, to avoid development over the surface exposed to air of a gel that does not harden properly in the later stages of the curing and that causes adherence of the composition to the adjacent mold surface, is effected in any convenient manner. Thus the air is excluded by evacuation, introducing a nitrogen atmosphere over the exposed surface in the mold, or covering the said surface with an air-excluding film such as one of mineral oil. Closed molds exclude air.

The two stage polymerization referred to above (this term including two or more stages) is required for best commercial results in the prevention of crazing and developing proper hardness.

We have discovered that temperatures of about 55° C. are particularly satisfactory for the first stage of the polymerization of the diallyl phthalate preferably with admixed methyl methacrylate monomer, followed by the second stage heating to a somewhat higher temperature, as, for example, 78° C. With such two-stage heating there is a pronounced decrease in the production of gel which does not harden and which adheres to the mold. At temperatures much above 80° C. for the final curing, there is formed in the inside of the thermosetting mass a gel which never hardens fully, even though the heating is continued for either a normal or abnormally long time. This is considered to be due in part to the action of the peroxide promoter at such high temperature as an oxidizer rather than a polymerization accelerator, the oxidizing given a permanently non-hardening gel-like product similar to that which is produced at the exposed surface during polymerization of the plastic when that surface is in contact with oxygen or air. At temperatures much below 55° C., the initial polymerization is too slow to be acceptable in many commercial casting and hardening operations.

Temperatures may be varied somewhat from those that are preferred and have been given. Thus, the first stage of the polymerization may be effected at temperatures up to 65° to 70° C., say from 55° to 60° C. and the final polymerization at temperatures between that of the initial polymerization and about 80° C. as a maximum, suitably at about 70° to 78° C.

The first stage warming is continued until the mixture being polymerized shrinks away from a mold of usual pattern. If the mold is one that is not transparent and does not permit observation of the composition, then a preliminary test on a portion of the material in a glass vessel will show, for any mixture, the temperature at which the shrinkage away from the walls of the mold occurs. This corresponds to passage of the composition through the soft gel stage of the polymerization. Once this stage or predetermined time period is passed, then the material is raised to a higher temperature as indicated for final curing.

We have found that periods of time of at least 15 to 30 hours are ordinarily required to effect the first stage of the curing at 60° C., the exact time decreasing with proportion of acrylic ester, if the final curing is to give a sufficiently hard product in a reasonable time. Using a total curing time of 76 hours with a mixture of diallyl phthalate and methyl methacrylate with a minor proportion of benzoyl peroxide as the promoter in the mixture, we have found the following results:

| Hours at 60° C. | Hours at 78° C. | Hardness |
|---|---|---|
| 24 | 52 | −7 |
| 28 | 48 | +50 |

Wherever hardness is expressed numerically herein, the Rockwell H scale is used.

Somewhat better results are obtained when the first part of a two-stage heating to cause thermosetting is effected at two different temperatures. Thus, the first warming is suitably effected at temperatures up to 55° C. and the second part at a temperature between 55° and 65° C., with the final curing at 78° C. as stated. We have used to advantage in setting of the mixture of diallyl phthalate and methyl methacrylate 40 hours heating at 55° C., 24 hours at 65° C., and then 36 hours at 75° to 78° C.

In general, the larger the casting the more care is required in the polymerization and ordinarily the lower the temperatures used within the ranges given above.

The invention will be further illustrated by detailed description in connection with the following specific examples of the practice of it.

Example 1

A composition consisting of

| | Parts |
|---|---|
| Diallyl phthalate | 23.75 |
| Methyl methacrylate | 1.25 |
| Benzoyl peroxide | 0.25 | was mixed in a usual manner and cast polymerized in a glass tube. The initial polymerization was effected at a temperature just below 70° C. until the casting had advanced beyond the soft gel stage. (The end of the soft gel stage is approximately indicated by the point where the gelled resin starts to pull away from the walls of the mold, i. e. where the shrinkage becomes apparent.) As the tendency for castings to craze is greatest during the period immediately following the early transition from liquid to gel state, it is important that the temperature be most carefully controlled at this time.

After the casting had advanced beyond the soft gel stage, the temperature was then raised to 78° C. without adverse effects, to decrease the length of time required to bring the resin to a satisfactory hardness.

After 42 hours at 78° C., the casting showed a hardness of 17 on the Rockwell Hardness H scale, after 64 hours a hardness of 41. The casting was a water-white and transparent material and was without bubbles or crazes when cast in small quantities. The surface exposed to the air during curing was slightly tacky.

Example 2

A composition consisting of

| | Parts |
|---|---|
| Diallyl phthalate | 22.50 |
| Methyl methacrylate | 2.50 |
| Benzoyl peroxide | 0.25 | was mixed and cast polymerized as under Example 1. After 42 hours at 78° C., the casting showed a hardness of 41 and after 64 hours a hardness of 58. The casting had the same appearance as the casting obtained in Example 1.

Example 3

A composition consisting of

| | Parts |
|---|---|
| Diallyl phthalate | 21.25 |
| Methyl methacrylate | 3.75 |
| Benzoyl peroxide | 0.25 | was mixed and cast polymerized as described under Example 1. After 42 hours at 78° C., the hardness was 58 and after 64 hours the hardness was 64. The casting had the same appearance as the castings obtained in Examples 1 and 2 but the top surface was less tacky.

Example 4

A composition consisting of

| | Parts |
|---|---|
| Diallyl phthalate | 170 |
| Methyl methacrylate | 30 |
| Benzoyl peroxide | 2.00 | was mixed and divided into two equal portions. One portion (a) was cast polymerized in a glass tube at 78° C. without initial polymerization at lower temperature. The other (b) was polymerized at 60° C. initially and then at a higher temperature.

After 4 hours at 78° C. tube a had gelled and was full of cracks and crazes even when cast in small quantities, such as 50 g. or less. The gel was soft and rubberlike with little mechanical strength. On further heating at this temperature for one week, the casting acquired no appreciable additional strength and turned yellow.

Tube b gelled in 18 hours at 60° C. and showed no crazes. After 64 hours at this temperature, the casting began to shrink away from the bottom of the glass mold. At this point, the temperature was raised to 75° C. and maintained for 24 hours. Upon removal from the mold, a perfect casting was obtained which had a hardness of 60.

The following table gives hardness data of interpolymers of diallyl phthalate with varying amounts of methyl methacrylate, other conditions kept constant. The general procedure for the polymerization was as described in Example 1 except as otherwise specifically indicated, the exact proportions of the diallyl phthalate and methacrylate monomers used being as shown in the table. The hardness was measured on Rockwell hardness scale at 20° C. The interior hardness was determined by measurement of the hardness of the center of the casting which was exposed by sanding off approximately half of the piece.

| Per Cent Composition of Resin | | Hardness after 42 hr. Cure | | Hardness after 64 hr. Cure | |
|---|---|---|---|---|---|
| Diallyl Phthalate | Methyl Methacrylate | Interior | Exterior | Interior | Exterior |
| 100 | 0 | −20 | −32 | 40 | −15 |
| 95 | 5 | 17 | 17 | 41 | 41 |
| 90 | 10 | 41 | 42 | 59 | 58 |
| 85 | 15 | 58 | 58 | 64 | 64 |

From the table above there will be noted the desirable effect of the methacrylate upon the hardness and particularly the great increase in hardness after the shorter curing period.

Example 5

Plastics made according to Examples 1 to 4 above, when cast and set in large masses, show objectionable adherence to the molds and crazing in the interior of the castings. These drawbacks are avoided by use of a parting material of the kind described above, say, in amounts of about 2 to 10% of the weight of the whole mixture and suitably around 5% or so when the parting material used is a polyhydric alcohol and an ether-alcohol such as a mixture of glycerine or ethylene glycol with diethylene glycol.

When the parting material is used, then the procedures and composition of Example 4(b), for instance, give cured plastics even of large size that separate readily from the walls of the mold and crazing is avoided, particularly when air is excluded from contact with the material during the setting.

It will be understood that it is intended to cover all changes and modifications of the example of the invention herein chosen for the purpose of illustration which do not constitute departures from the spirit and scope of the invention.

What we claim is:

1. In cast polymerizing plastic compositions to hard condition without crazing, the method which comprises forming an intimate mixture of diallyl phthalate, an acrylic ester that is heat polymerizable to solid condition in the proportion of 5 to 25 parts for 100 of said ester and phthalate, an organic peroxide polymerization promoter and a parting composition, casting the mixture into a mold, warming the casting to a temperature between 55° and 70° C., continuing the warming within this temperature range until the mixture is polymerized through the soft gel stage, and then raising the temperature and completing the polymerization of the entire mass, at a temperature of about 70° to 80° C., to a plastic that is hard when cooled to room temperature, the said parting composition including a lower polyhydric alcohol that contains no ether group and that is insoluble in the said mixture and in addition an ether-alcohol that is soluble in the said mixture as first made and is a solvent for the polyhydric alcohol, the ether-alcohol serving as an agent causing solution of the polyhydric alcohol in the said mixture.

2. The method described in claim 1, the said ether-alcohol being diethylene glycol.

JOHN K. MAGRANE.
AMOS RAYMOND ESTERLY.
RICHARD E. DAVIES.

REFERENCES CITED

The following references are of record in the file of this patent:

UNITED STATES PATENTS

| Number | Name | Date |
|---|---|---|
| 2,318,959 | Muskat et al. | May 11, 1943 |
| 2,273,891 | Pollack et al. | Feb. 24, 1942 |
| 2,218,439 | Rothrock | Oct. 15, 1940 |
| 2,256,160 | Britton et al. | Sept. 16, 1941 |
| 2,346,708 | Smidth | Apr. 18, 1944 |
| 2,338,787 | Ushakoff | Jan. 11, 1944 |
| 2,259,524 | Kistler | Oct. 21, 1941 |
| 2,154,639 | Rohm et al. | Apr. 18, 1939 |
| 2,370,562 | Meunier | Feb. 27, 1945 |
| 1,866,025 | Geller | July 5, 1932 |
| 2,379,218 | Dial et al. | June 26, 1945 |